United States Patent
Jenkins et al.

(10) Patent No.: US 11,953,065 B2
(45) Date of Patent: Apr. 9, 2024

(54) ANTI-RATTLE CALIPER ASSEMBLY

(71) Applicant: ZF Active Safety US Inc., Livonia, MI (US)

(72) Inventors: Perry J. Jenkins, Lake Orion, MI (US); Galus Chelaidite, South Lyon, MI (US)

(73) Assignee: ZF Active Safety US Inc., Livonia, MI (US)

( * ) Notice: Subject to any disclaimer, the term of this patent is extended or adjusted under 35 U.S.C. 154(b) by 478 days.

(21) Appl. No.: 17/403,150

(22) Filed: Aug. 16, 2021

(65) Prior Publication Data
US 2023/0050101 A1    Feb. 16, 2023

(51) Int. Cl.
| | | |
|---|---|---|
| F16D 55/08 | (2006.01) | |
| F16D 55/226 | (2006.01) | |
| F16D 65/00 | (2006.01) | |
| F16D 65/18 | (2006.01) | |
| F16D 55/00 | (2006.01) | |
| F16D 121/04 | (2012.01) | |
| F16D 125/40 | (2012.01) | |

(52) U.S. Cl.
CPC ....... *F16D 65/0006* (2013.01); *F16D 55/226* (2013.01); *F16D 65/18* (2013.01); *F16D 2055/0041* (2013.01); *F16D 2121/04* (2013.01); *F16D 2125/40* (2013.01)

(58) Field of Classification Search
CPC ............................... F16D 55/226; F16D 65/18
See application file for complete search history.

(56) References Cited

U.S. PATENT DOCUMENTS

| | | | | |
|---|---|---|---|---|
| 8,844,683 | B2 * | 9/2014 | Sternal | B60T 7/122 188/72.6 |
| 9,568,056 | B2 | 2/2017 | Platzer et al. | |
| 9,835,212 | B2 * | 12/2017 | Patel | F16D 55/226 |
| 10,288,137 | B2 | 5/2019 | Chelaidite et al. | |
| 2013/0327606 | A1 * | 12/2013 | Platzer | F16D 65/0006 188/368 |
| 2017/0159733 | A1 * | 6/2017 | Chelaidite | F16D 55/226 |
| 2018/0298969 | A1 * | 10/2018 | Demorais | F16D 55/226 |
| 2020/0224737 | A1 | 7/2020 | Walden | |

(Continued)

FOREIGN PATENT DOCUMENTS

| | | |
|---|---|---|
| DE | 102010033255 A1 | 2/2012 |
| DE | 102011080940 A1 | 6/2012 |

(Continued)

OTHER PUBLICATIONS

German Search Report for corresponding German Application Serial No. 10 2022 208 251.6, dated Apr. 19, 2023, pp. 1-12.

*Primary Examiner* — Nicholas J Lane

(74) *Attorney, Agent, or Firm* — Robert James Harwood

(57) ABSTRACT

A piston assembly for a disc brake assembly having a housing with a passage includes a piston provided in the passage and axially movable therein in response to hydraulic pressure. A rotatable spindle extends into the piston. A nut is threadably connected to the spindle such that rotation of the spindle results in axial movement of the nut within the passage to thereby axially move the piston. A damping member encircles the nut and has one of a sliding and rolling interface with the piston in response to relative axial movement between the nut and the piston to prevent rattling of the nut against the piston.

20 Claims, 14 Drawing Sheets

(56) References Cited

U.S. PATENT DOCUMENTS

2022/0389981 A1* 12/2022 Leiter .................. F16D 65/183
2023/0123351 A1*  4/2023 Baek ...................... B60T 13/58
                                                            188/72.1

FOREIGN PATENT DOCUMENTS

DE     102017118715 A1    2/2019
DE     102009012016 B4    1/2020

* cited by examiner

ANTI-RATTLE CALIPER ASSEMBLY

TECHNICAL FIELD

The present invention relates to braking systems and, in particular, relates to a parking brake having anti-rattle countermeasures.

BACKGROUND

Current vehicles are equipped with hydraulic service brakes and electric parking brakes (EPB) for helping control vehicle braking depending on predetermined scenarios. The service brakes rely on one or more movable pistons that selectively apply force to brake pads in order to slow down or stop rotating wheel rotors on the vehicle. The EPB can be used to, for example, supplement the service braking and/or maintain the vehicle at a standstill on a hill.

SUMMARY

In one example, a piston assembly for a disc brake assembly having a housing with a passage includes a piston provided in the passage and axially movable therein in response to hydraulic pressure. A rotatable spindle extends into the piston. A nut is threadably connected to the spindle such that rotation of the spindle results in axial movement of the nut within the passage to thereby axially move the piston. A damping member encircles the nut and has one of a sliding interface and a rolling interface with the piston in response to relative axial movement between the nut and the piston to prevent rattling of the nut against the piston.

In another example, a piston assembly for a disc brake assembly having a housing with a passage includes a piston provided in the passage and axially movable therein in response to hydraulic pressure. A rotatable spindle extends into the piston. A nut is threadably connected to the spindle such that rotation of the spindle results in axial movement of the nut within the passage to thereby axially move the piston. A brake fluid volume reducer is connected to the nut and includes a recess. An annular damping member is provided in the recess and has a circular cross-section in the circumferential direction. The damping member has a rolling interface between the recess and the piston in response to relative axial movement between the nut and the piston to prevent rattling of the nut against the piston.

Other objects and advantages and a fuller understanding of the invention will be had from the following detailed description and the accompanying drawings.

DETAILED DESCRIPTION

Figure 1:
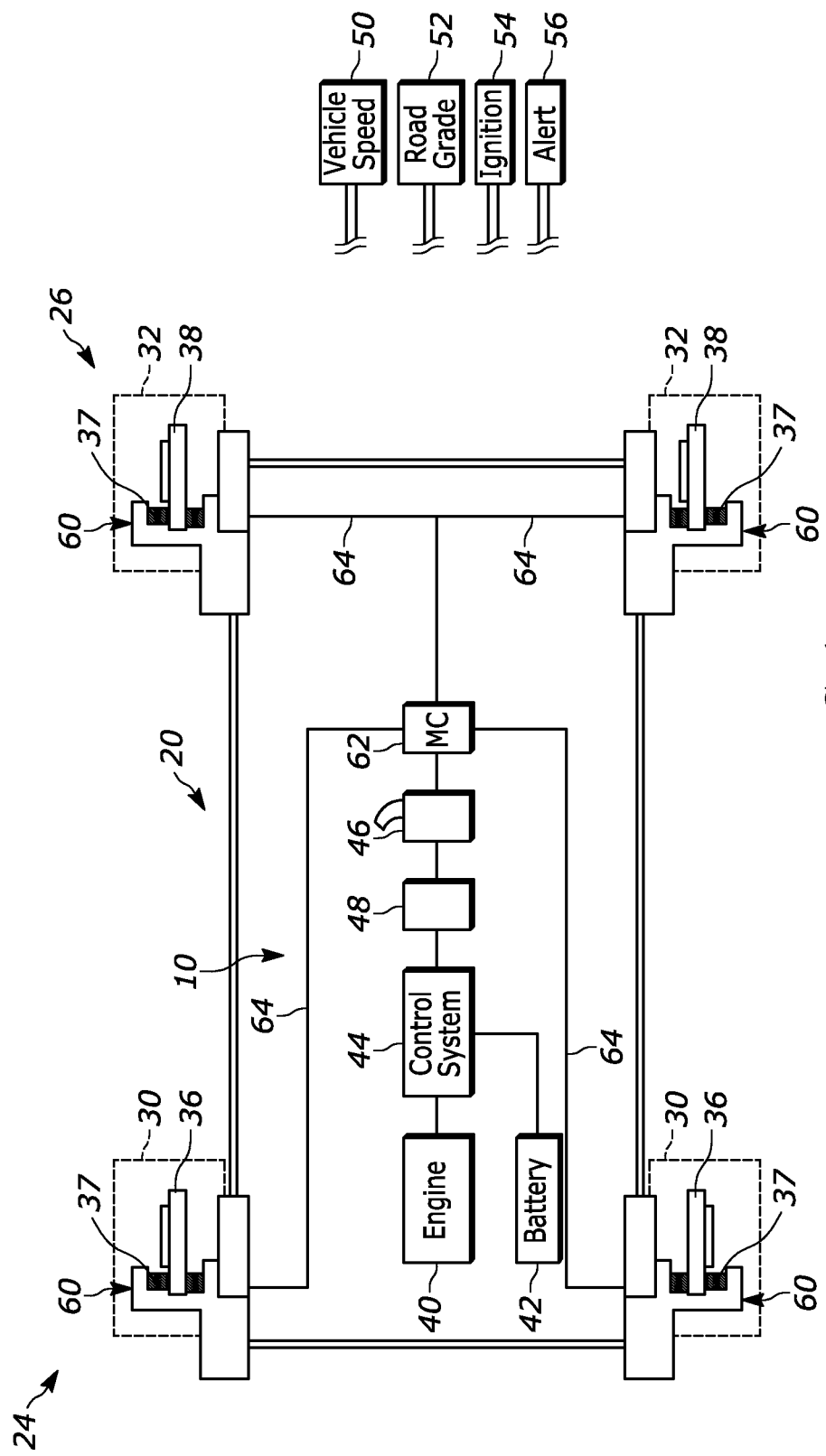
FIG. 1 is a schematic illustration of a vehicle having a braking system including an example caliper assembly.

The present invention relates to braking systems and, in particular, relates to a parking brake having anti-rattle countermeasures. FIG. 1 illustrates an example braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

A propulsion system 40 including an engine and/or electric motor supplies torque to the wheels rotors 36 and/or the wheels rotors 38. A battery 42 supplies power to the vehicle 20. A brake pedal simulator 46 or brake pedal (not shown) is provided for controlling the timing and degree of vehicle 20 braking. A sensor 48 is connected to the brake pedal simulator 46 and monitors the displacement and acceleration of the brake pedal simulator.

A caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. It will be appreciated, however, that only the front wheel rotors 36 or only the rear wheel rotors 38 can include a caliper assembly 60 (not shown). The caliper assemblies 60 are connected to a master cylinder 62 by hydraulic lines 64. It will be appreciated that the fluid system for the caliper assemblies 60 and master cylinder 62 has been greatly simplified for brevity.

A control system 44 is provided for helping control operation of the vehicle 20, such as operation of the propulsion system 40 and vehicle braking, including operating the caliper assemblies 60. To this end, the control system 44 can include one or more controllers, such as a transmission controller, propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of when the ignition is turned on. The control system 44 can receive and interpret these signals and perform vehicle functions, e.g., braking, in response thereto. The control system 44 can also be connected to an alert 56 for notifying the driver/operator of the vehicle 20 of vehicle conditions, vehicle status, and/or environmental conditions.

Figure 2A:
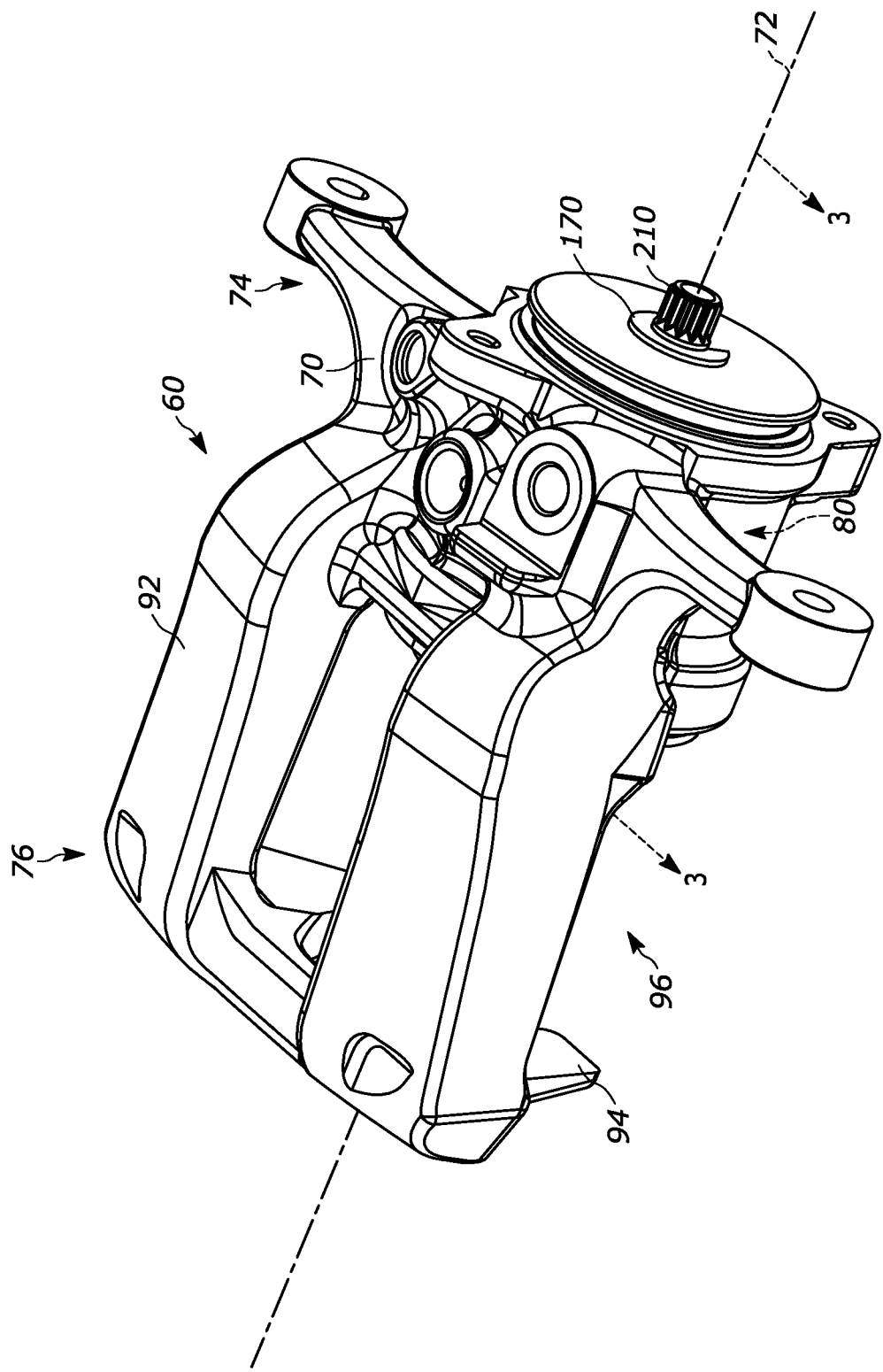
FIG. 2A is a side view of the caliper assembly.
Figure 2B:
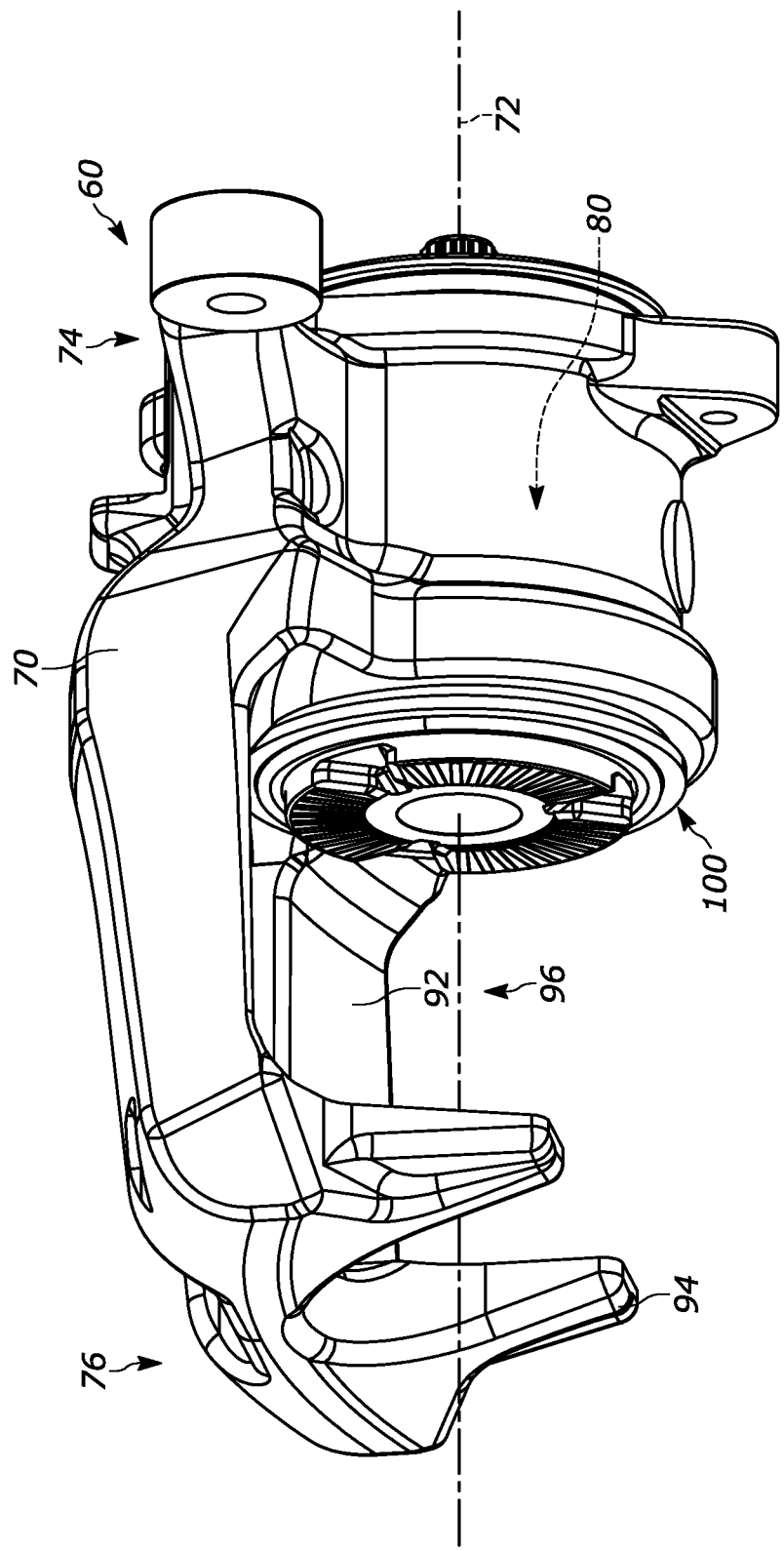
FIG. 2B is a bottom view of the caliper assembly of FIG. 2A.

Referring to FIGS. 2A-2B, the caliper assembly 60 includes a housing 70 extending generally along a centerline 72 from a first end 74 to a second end 76. A bore or passage 80 extends into the housing 70 and along the centerline 72 (see FIG. 3). The passage 80 is fluidly connected to hydraulic lines (not shown) for providing hydraulic fluid thereto. An annular recess or seal groove 86 is provided in the passage 80.

A bridge 92 extends from the second end 76 of the housing 70 and along/parallel to the centerline 72. A projection 94 extends from the bridge 92 and transverse to the centerline 72. The bridge 92 and projection 94 cooperate to define a channel 96 for receiving the rotor 36 or 38 of one of the wheels 30 or 32.

Figure 3:
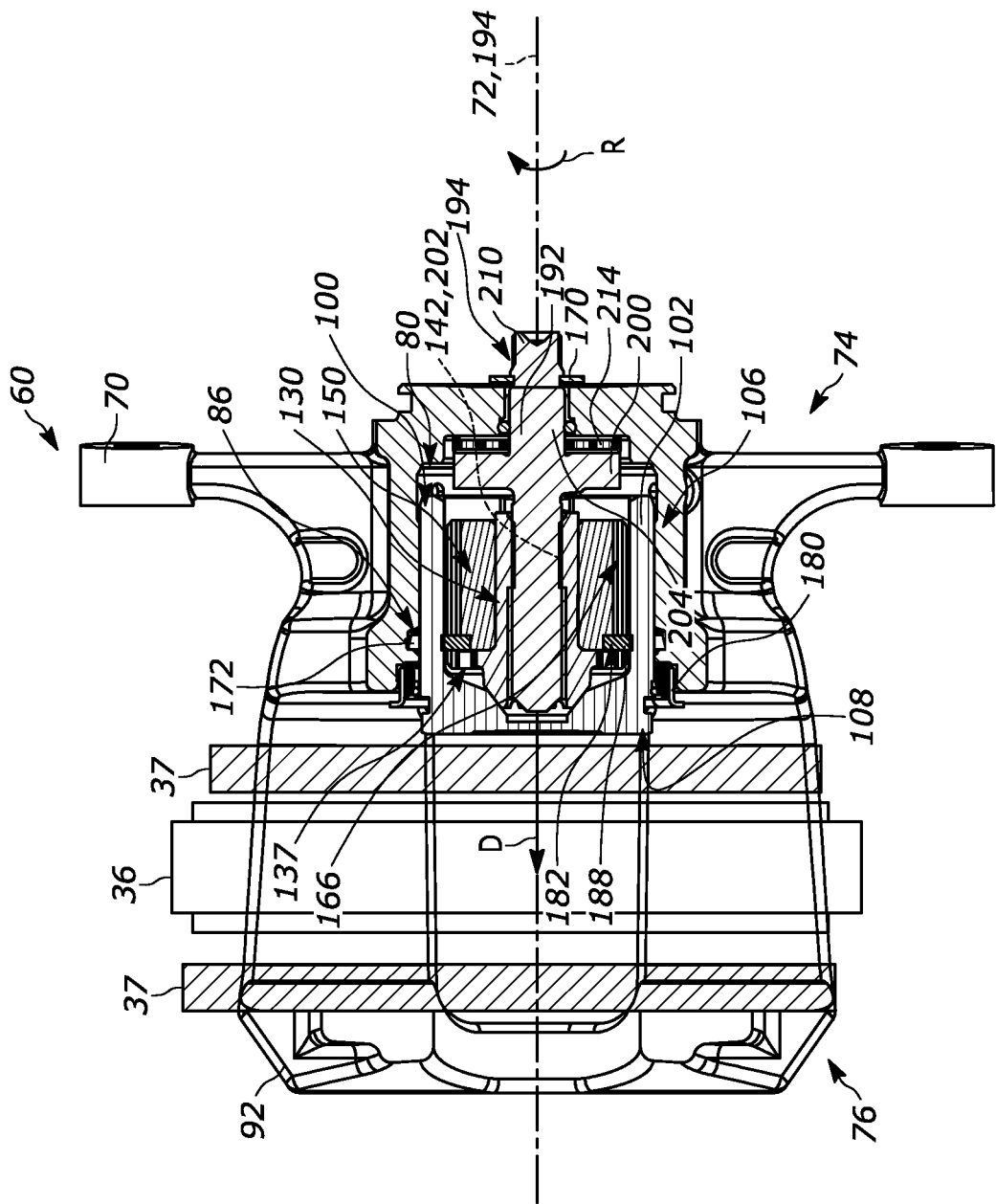
FIG. 3 is a section view taken along line 3-3 of FIG. 2A.
Figure 4:
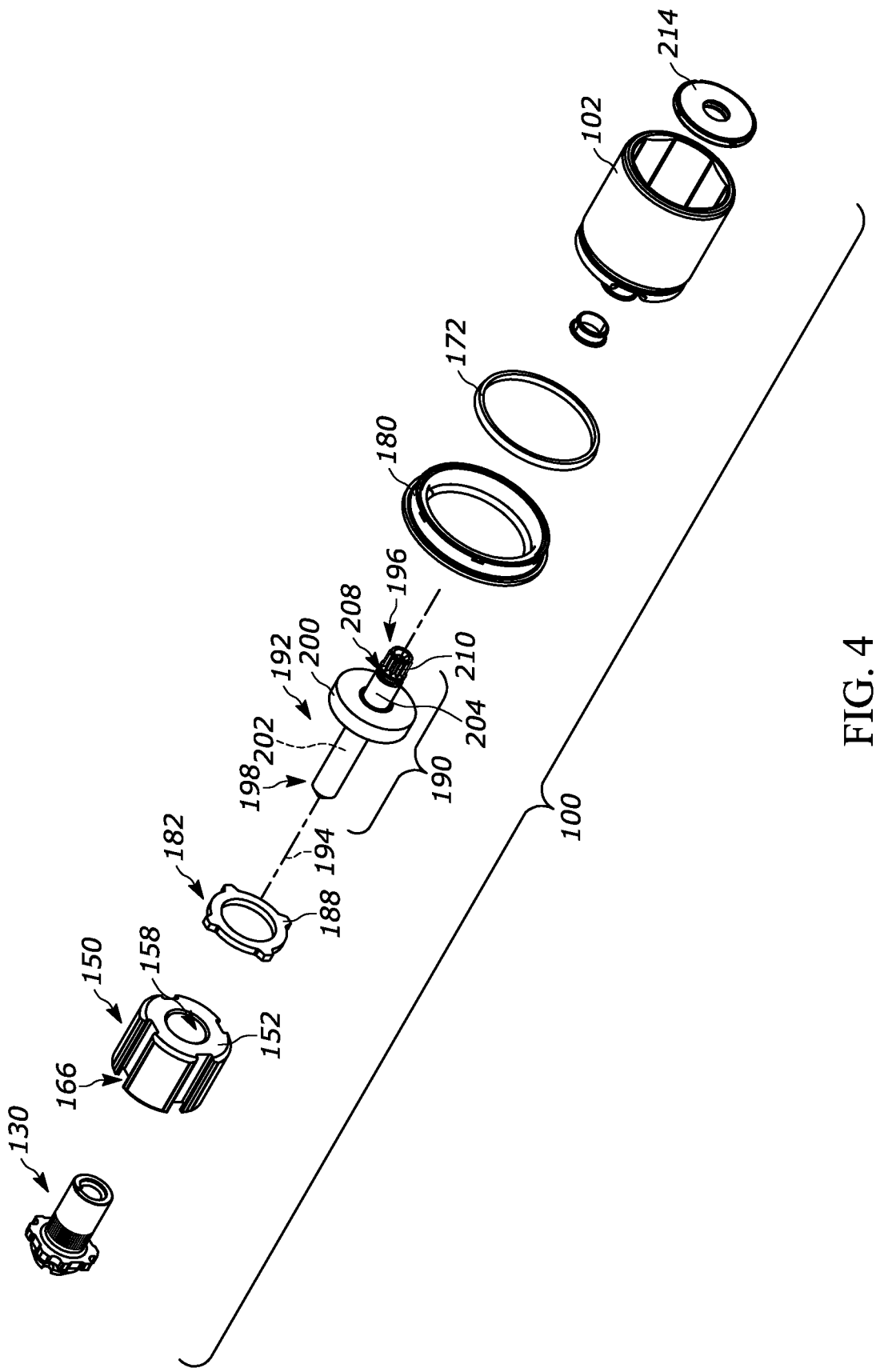
FIG. 4 is an exploded view for a piston assembly of the caliper assembly.
Figure 5:
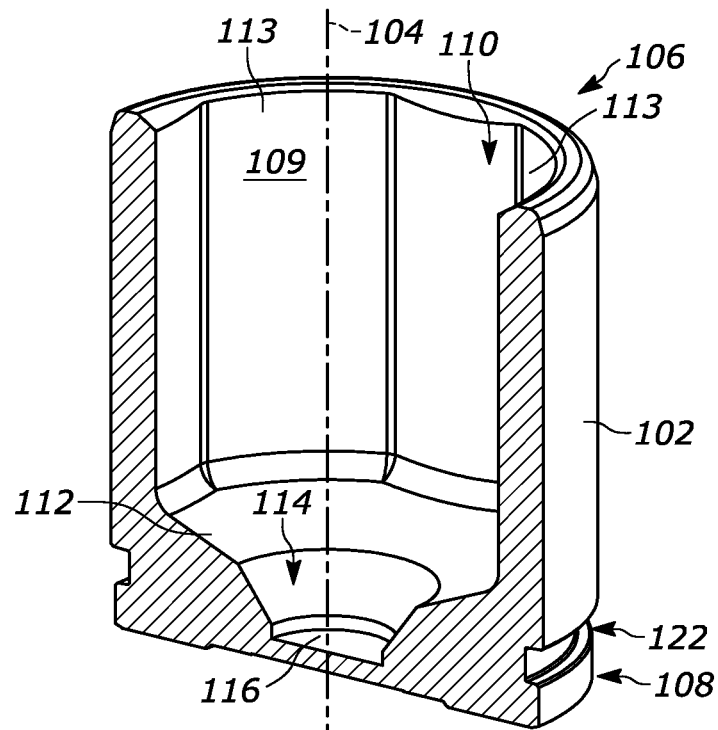
FIG. 5 is a section view of a piston of the piston assembly.

Referring to FIGS. 3-4, a piston assembly 100 is provided in the passage 80. The piston assembly 100 includes a piston 102, a nut 130, a brake fluid volume reducer 150, and a spindle assembly 190. Alternatively, the volume reducer 150 is omitted (not shown). As shown in FIG. 5, the piston 102 extends along a centerline 104 from a first end 106 to a second end 108. An inner surface 109 defines a first cavity 110 having an axial cross-section defined by a series of internal lobes 113. The first cavity 110 extends from the first end 106 towards the second end 108 and terminates at a tapered or frustoconical axial end surface 112.

A second cavity 114 extends from the end surface 112 towards the second end 108 and terminates at an axial end surface 116. An annular recess 122 is provided on the exterior of the piston 102 at the second end 108 thereof. The annular recess 122 encircles the centerline 104. The piston 102 is formed from a material that is durable in both compression and tension, such as steel, aluminum or the like.

Figure 6A:
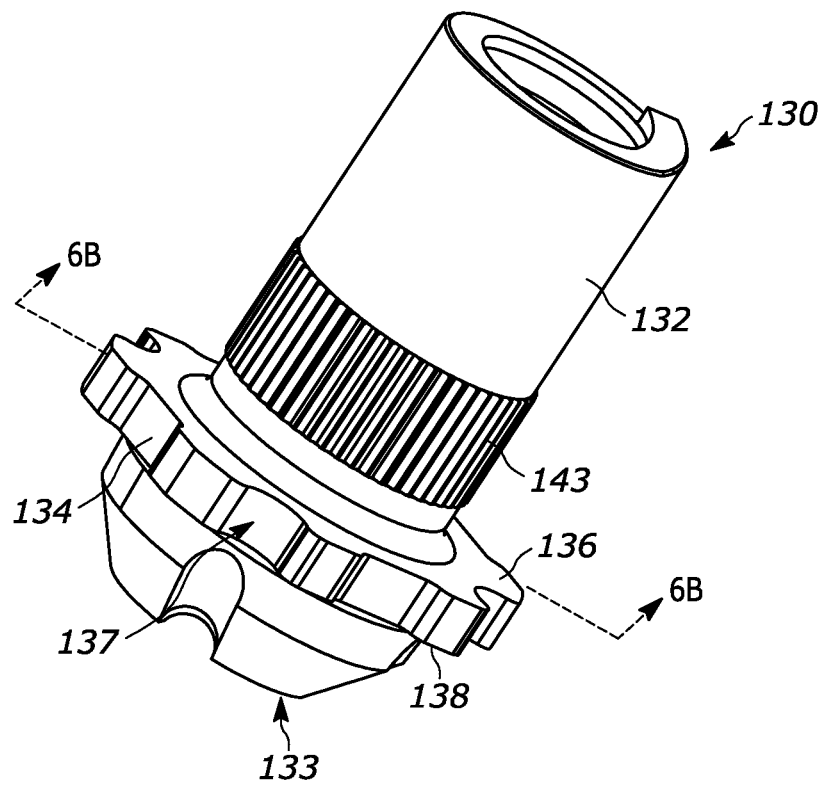
FIG. 6A is a front view of a nut of the piston assembly.
Figure 6B:
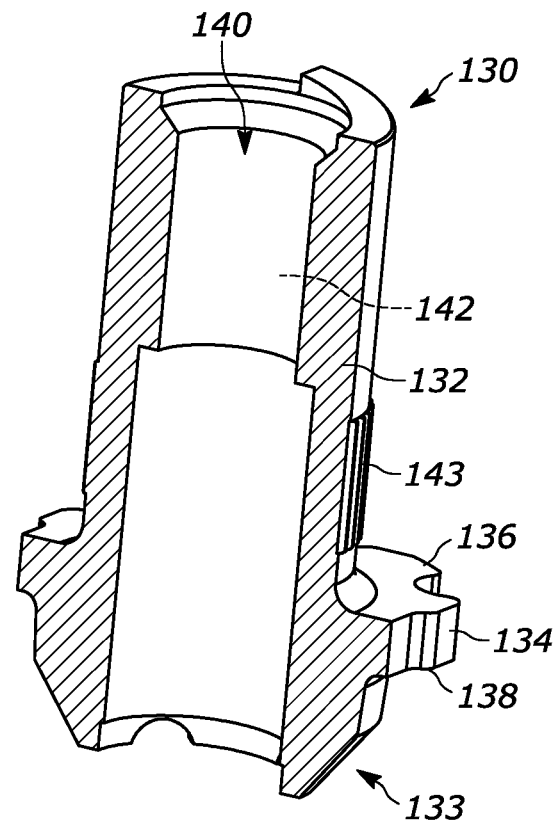
FIG. 6B is a section view taken along line 6B-6B of FIG. 6A.

The nut 130 (FIGS. 6A-6B) is provided in the first cavity 110 of the piston 102. The nut 130 includes a base 132 and a flange 134 extending radially outward therefrom. The base 132 terminates at a tapered or pointed end 133 that abuts the axial end surface 112 of the piston 102 and has the same shape/contour as the second cavity 114. A central passage 140 extends through the base 132 and the flange 134 along the entire length of the nut 130. Threads (indicated in phantom at 142) are provided along a portion of the central passage 140. A spline 143 is provided along the exterior of the base 132 adjacent the flange 134. The flange 134 includes a first and second axial end surfaces 136, 138. Pockets 137 extend radially into the flange 134 and are arranged circumferentially about the flange.

Figure 7A:
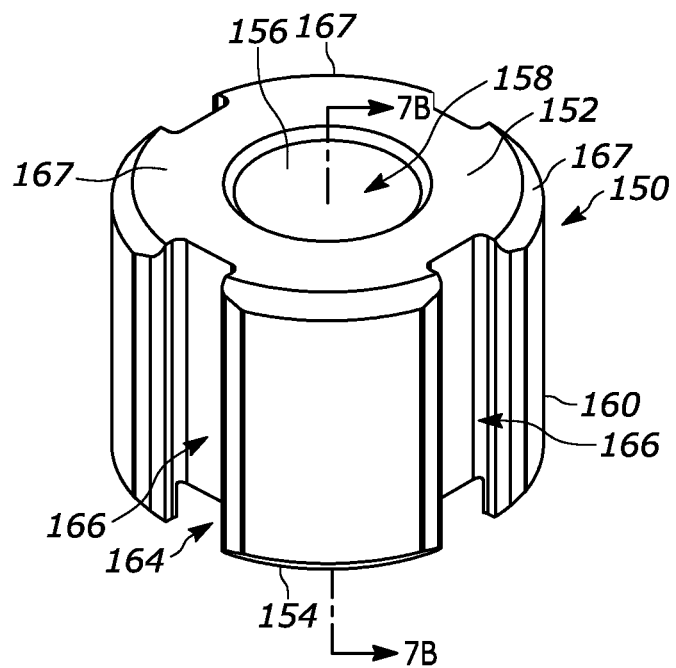
FIG. 7A is a front view of a brake fluid volume reducer of the piston assembly.
Figure 7B:
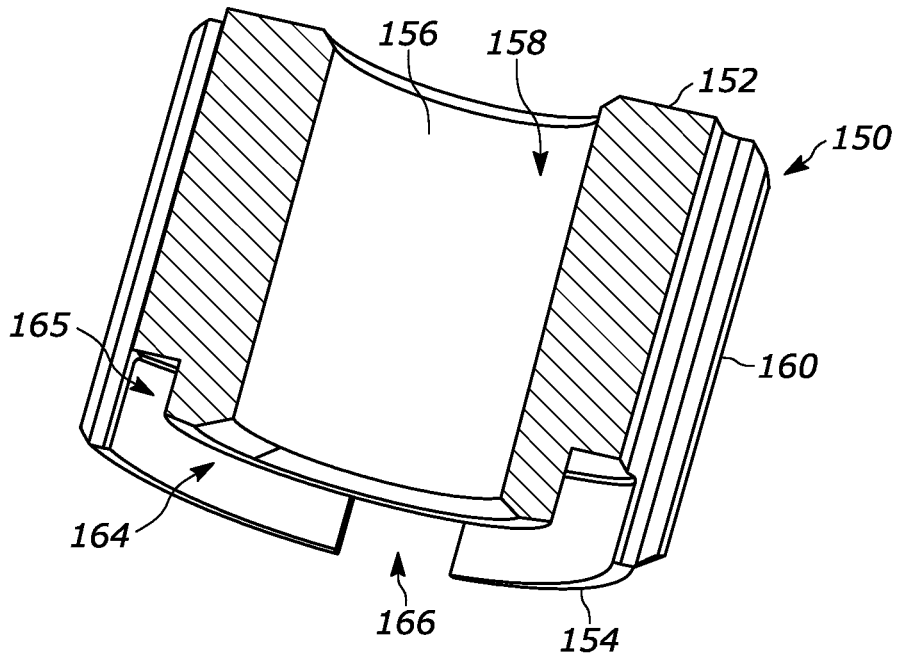
FIG. 7B is a section view taken along line 7B-7B of FIG. 7A.

Referring to FIGS. 7A-7B, the volume reducer 150 is generally cylindrical and extends longitudinally between first and second axial end surfaces 152, 154. An inner surface 156 defines a central passage 158 extending the entire length of the reducer 150 from the axial end surface 152 to the axial end surface 154. The inner surface 156 can include splines (not shown) that mate with the splines 143 on the nut 130. A countersink or first recess 164 extends from the second axial end surface 154 towards the first axial end surface 152 and intersects with the central passage 158. The countersink 164 narrows to an annular groove 165 that encircles the central passage 158.

Recesses or pockets 166 extend the entire length of the volume reducer 150 in a direction parallel to the central passage 158. The recesses 166 are symmetrically arranged about the central passage 158. The pockets 166 extend radially inward a depth sufficient to intersect the central passage 158. In this manner, the pockets 166 form a series of second recesses extending radially outward from the groove 165. The reducer 150 also includes an outer surface 160 that cooperates with the recesses 166 to define a series of external lobes 167 circumferentially separated by the recesses 166. The reducer 150 can be formed from an incompressible and lightweight material, such as aluminum or phenolic.

It will be appreciated that although the nut 130 and reducer 150 are shown and described as separate components, the nut and reducer could likewise be formed integrally with one another. In other words, the nut 130 could exhibit the collective shape of the nut and reducer 150 instead of providing each as a separate component. The reducer 150 can also be omitted entirely. In either configuration, the nut 130 can include the recesses 164, 166 and groove 165 currently shown in the reducer 150. In any case, the nut 130 and reducer 150 are securely fixed or connected to the piston 102 in a manner that prevents relative rotation therebetween but allows for relative axial movement.

Figure 8A:
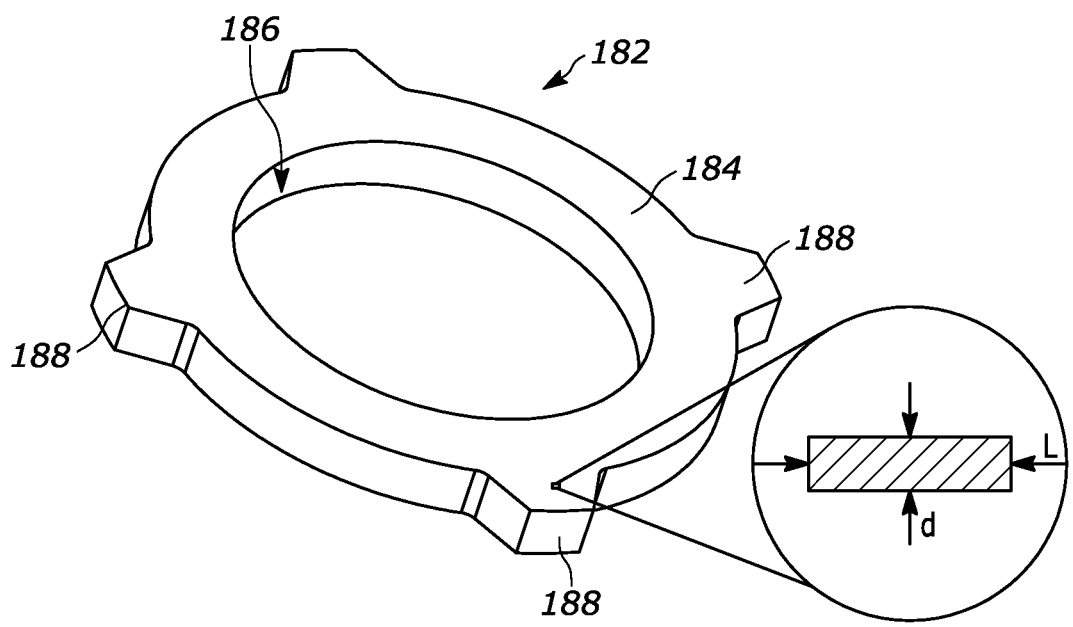
FIG. 8A is an example damping member for the piston assembly.

As shown in FIG. 8A, the piston assembly 100 further includes a damping member 182 connected to the volume reducer 150 for reducing or preventing rattling of the nut/reducer against the piston 102 during the braking operation. In configurations where the volume reducer 150 is omitted, the damping member 182 is connected to the nut 130 (not shown).

In one example, the damping member 182 includes an annular base 184 defining a central passage 186. The base 184 can have a rectangular circumferential cross-section (as shown) or a different circumferential cross-section, such as rounded or circular (not shown). Referring to the inset, the rectangular cross-section can have a length L and a depth d, The length-to-depth ratio (L/d) can be tailored to match the particular application, as will be discussed. In this example, the ratio L/d is greater than one.

Projections 188 extends radially outward from the base 184. Four projections 188 are illustrated although any number of projections can extend from the base 184. The projections 188 can be trapezoidal (as shown) or exhibit another shape, e.g., triangular, rounded, polygonal, etc. Alternatively, the projections 188 can be omitted (not shown).

Figure 8B:
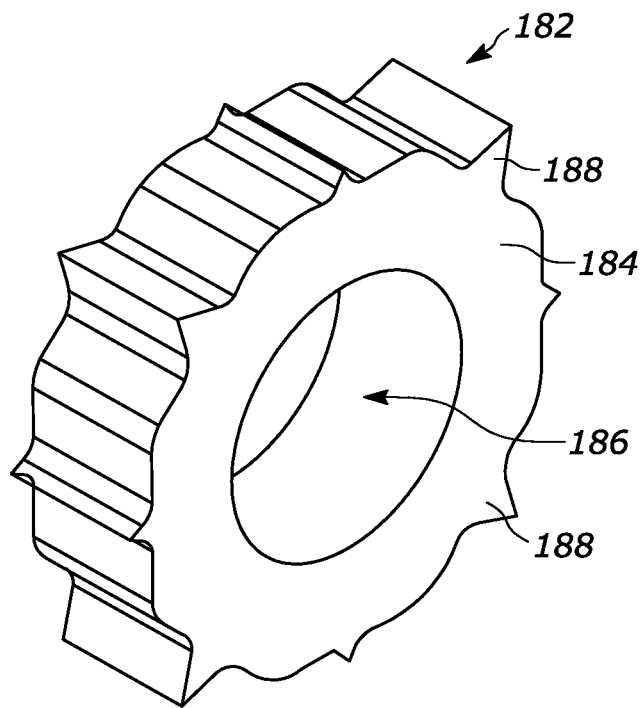
FIG. 8B is another example damping member for the piston assembly.
Figure 8C:
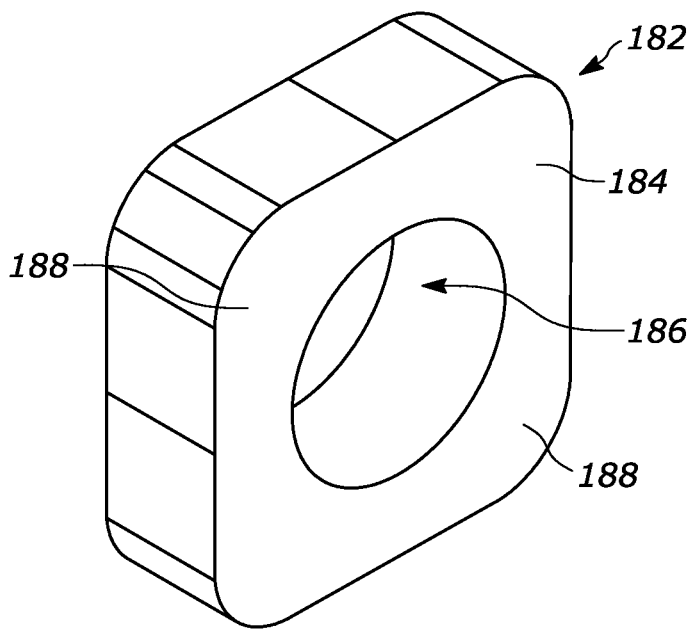
FIG. 8C is another example damping member for the piston assembly.

The projections 188 can be symmetrically arranged (as shown) about the central passage 186 or asymmetrically arranged (not shown). FIGS. 8B and 8C illustrate additional example damping members 182 in accordance with the present invention. In FIG. 8B, the projections 188 are triangular. In FIG. 8C, the projections 188 are rounded corners provided on a rectangular base 184.

Regardless of the particular shape, the damping member 182 is made from a resilient material such as a polymer, e.g., rubber, or plastic. In one example, the damping member 182 is made from an ethylene propylene diene monomer (EPDM). That said, the damping member 182 can have a hardness of, for example, about 85 Shore A. The ratio L/d is less than one in both constructions shown in FIGS. 8B-8C. Preferably, the damping member 182 has a hardness level of around 60 shore A.

Returning to FIG. 4, the spindle assembly 190 extends through the piston assembly 100. The spindle assembly 190 includes a spindle 192 extending along an axis 194 from a first end 196 to a second end 198. A projection or flange 200 extends radially from the spindle 192 at a position between the first and second ends 196, 198. External threads (indicated in phantom at 202) are provided at a location between the flange 200 and the second end 198. An unthreaded portion 204 extends from the flange 200 towards the first end 196 and terminates at an annular recess 208. A splined portion 210 extends from the annular recess 208 to the extent of the first end 196. A thrust bearing 214 is received by the unthreaded portion 204 and abuts the flange 200. A retaining ring 170 is configured to snap into the recess 208 on the first end 196 of the spindle 192.

Figure 9A:
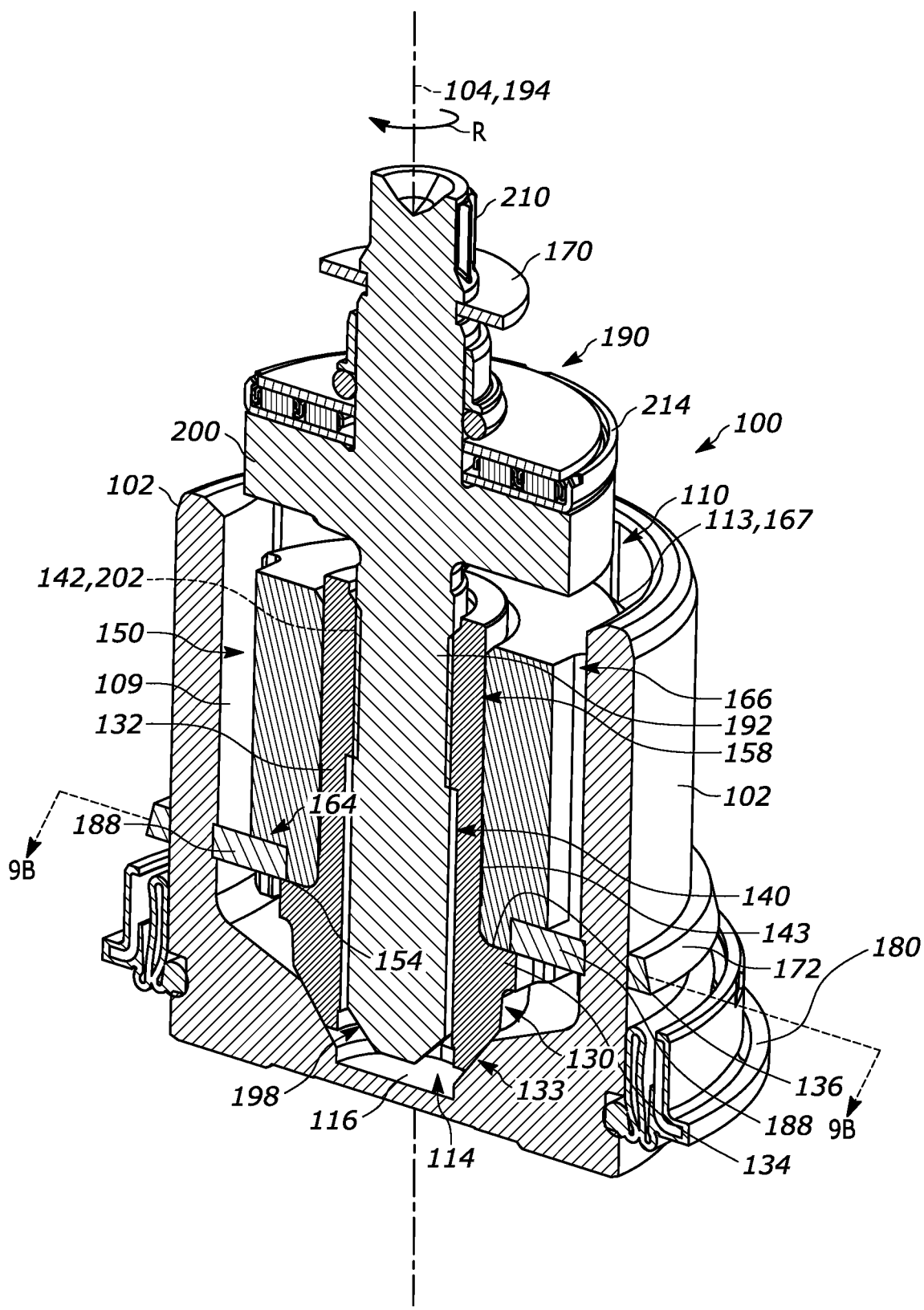
FIG. 9A is a first section view of the piston assembly when assembled.
Figure 9B:
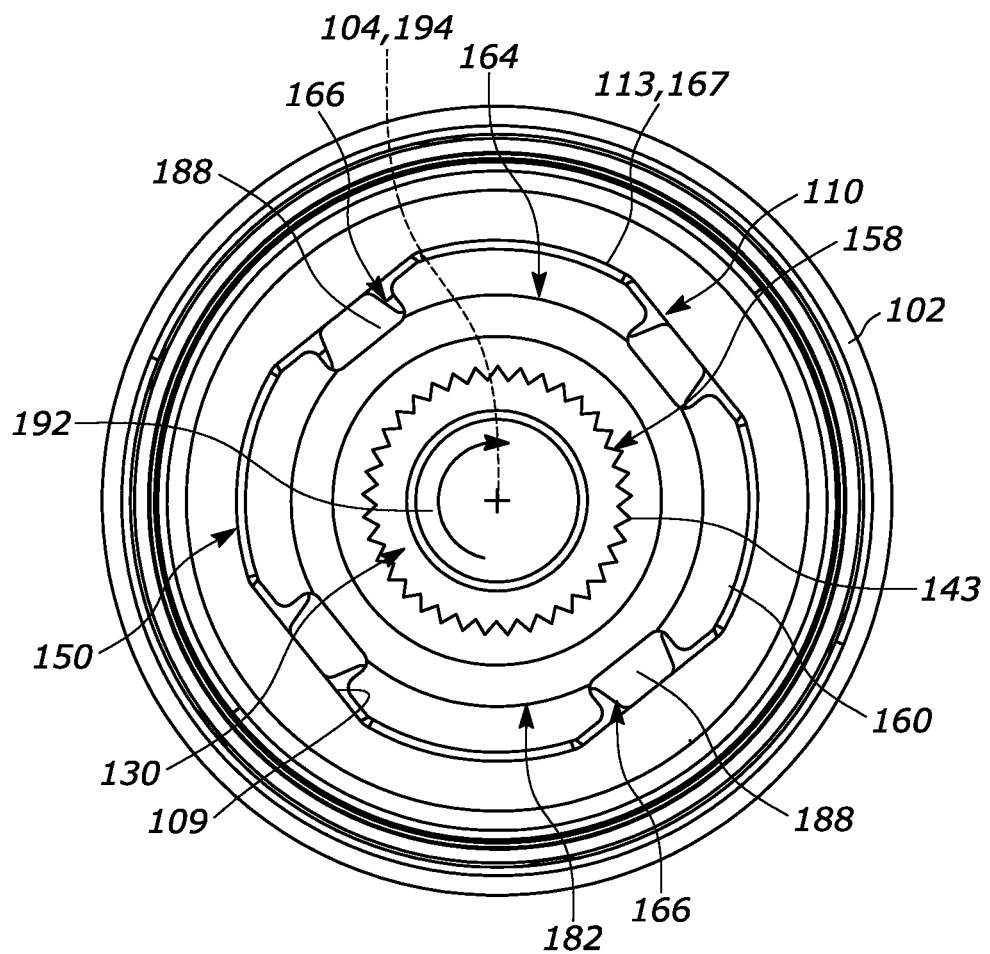
FIG. 9B is a second section view of the piston assembly when assembled.

The assembled piston assembly 100 is shown in FIGS. 9A-9B. The reducer 150 is received in the first cavity 110 of the piston 102 such that the external lobes 167 on the reducer are aligned with the internal lobes 113 on the piston. Due to this alignment, the reducer 150 is only capable of axial—not rotational—movement relative to the piston 102. With this in mind, the outer surface 160 of the reducer 150 is purposefully spaced radially inwardly from the inner surface 109 of the piston 102 to facilitate this relative axial movement.

The base 132 of the nut 130 is received by the central passage 158 of the reducer 150 such that the axial end surface 154 of the reducer abuts the axial end surface 136 on the flange 134 of the nut 130. The end 133 of the nut 130 extends into the second cavity 114 and bottoms out therein. The spline 143 on the nut 130 engages the spline (not shown) on the reducer 150 to prevent relative rotation therebetween.

The spindle 192 extends through the central passage 140 in the nut 130 such that the centerline 104 and axis 194 are aligned. The second end 198 of the spindle 192 is positioned within the end 133 adjacent the axial end surface 116 of the piston 102. The threads 202 on the spindle 192 are threadably engaged with the threads 142 on the nut 130. A seal 172 extends around the exterior of the second end 108 of the piston 102. A piston boot excluder 180 is provided in the annular recess 122 and cooperates with the housing 70 to help prevent dirt and debris from entering the passage 80 (see also FIG. 3).

The damping member 182 is positioned within the groove 165 and abuts the axial end surface 136 of the flange 134 on the nut 130. This pins or sandwiches the damping member 182 between the flange 134 and the reducer 150 to prevent relative axial movement therebetween. The damping member 182 is oriented in the groove 165 such that the projections 188 are aligned with and extend into the pockets 166. In other words, the projections 188 extend radially outward from the groove 165 and towards the inner surface 109 of the piston 102. It will be appreciated that when no projections 188 are provided on the damping member 182 (not shown), the outer periphery of the damping member still extends radially outward of the flange 134.

It will also be appreciated that when the volume reducer 150 is omitted the damping member 182 can be provided over the base 132 of the nut 130 adjacent the flange 134. The damping member 182 encircles the nut 130 whether the volume reducer 150 is present or not.

In any case, the projections 188 can form various fits or interfaces with the piston 102 inner surface 109, e.g., friction or interference fit, sliding or clearance fit, etc. In any case, since the outer surface 160 of the reducer 150 is spaced from the inner surface 109 of the piston 102, the projections 188 act to center the reducer within the first cavity 110 and, thus, act to center the nut 130 and spindle 192 within the first cavity.

Referring back to FIG. 3, the piston assembly 100 is positioned within the passage 80 in the housing 70 with the first end 106 of the piston being positioned closer to the first end 74 of the housing while the second end 108 is positioned closer to the second end 76. The seal 172 is positioned in the seal groove 86 in the passage 80 and is configured to cooperate with the seal grooves to seal the piston 102 within the passage 80.

The unthreaded portion 204 of the spindle 192 extends out of the passage 80 and to the exterior of the housing 70. The thrust bearing 214 is provided on the unthreaded portion 204 and prevents axial movement of the spindle 190. A retaining ring 170 is positioned in the annular recesses 208 and outside the housing 70 to prevent the spindle 192 from moving axially towards the second end 76 of the housing.

The splined portion 210 of the spindle 192 is connected to a motor assembly (not shown) for selectively rotating the spindle about the axis 194 in the manner indicated generally at R during application of the parking brake. The motor assembly includes a motor, a gear train assembly that can be adjusted depending on the application, and solenoid brake, e.g., normally locked, spring loaded brake for selectively allowing and preventing rotation of the motor and gear train assembly (not shown).

During operation of the braking system 10, a service brake demand initiated by the system and/or vehicle operator causes hydraulic fluid to be delivered via the hydraulic line to the passage 80 of at least one caliper assembly 60. In this example, service braking is shown for a single, rear end 26 wheel rotor 38.

The hydraulic fluid pressure builds within the passage 80 and behind/upstream of the piston assembly 100 until the fluid pressure is sufficient to urge the piston 102 in the direction D towards the wheel rotor 38. More specifically, the piston 102 is urged to move axially in the direction D relative to the stationary nut 130, volume reducer 150, and spindle 192 towards and into engagement with the brake pad 37 on the wheel rotor 38. Consequently, the service brake is applied and the bridge 92 of the housing 70 elastically deforms in a known manner. The pockets 137 in the nut 130, in combination with the circumferentially spaced projections 188 on the damping member 182, allow for air trapped in the second cavity 114 to bleed out during hydraulic pressure build-up, thereby maximizing the volume of hydraulic fluid that can be received by the piston. Furthermore, since the air is compressible any air trapped within the second cavity 114 can impair the ability of the brake system to generate adequate braking force. Consequently, it is desirable to remove as much of the trapped air as quickly as possible during braking operations. If the demand for service brakes is stopped, hydraulic fluid is no longer supplied to the passage 80 and, thus, the piston 102 is no longer urged in the direction D towards the brake pad 37. This allows the elastically deformed bridge 92, housing 70, and pads 37 to automatically relax and push the piston 102 back towards the passage 80 in the direction opposite the direction D. The spindle 192 is free to rotate in a direction opposite the direction R to accommodate the axial return movement of the piston.

When it is desirable to apply and maintain a parking brake on the wheel rotor 38 without hydraulic assistance, the control system 44 (see FIG. 1) directs electrical power of polarity A to be applied to the motor assembly. This causes the motor assembly to rotate in the direction R, such that the spindle 192 is also rotated. It will be appreciated that the configuration of the gear train assembly will dictate which direction the spindle 192 rotates when the motor rotates in the direction R. In this example, the spindle 192 rotates in the same direction R as the motor rotates. When the control system 44 detects sufficient current draw from the motor assembly, the ECU shuts off power to the motor assembly and the threaded interface between spindle and nut, being a low mechanical efficiency interface, is designed to automatically lock, a design characteristic also called "self-lock".

When it is desirable to release the parking brake, thereby allowing wheel rotor 38 to be able to rotate without frictional drag, electrical power of polarity opposite A is applied to motor assembly causing the spindle 192 to rotate in the opposite direction of direction R. Electrical power is turned off when the control system 44 determines that the brake is fully released, such that the piston 102 is no longer applying force against the pads 37 and against the rotor 38.

During initial release of the service brake and/or parking brake, the end 133 of the nut 130 can move axially away from and relative to the axial end surface 116 sufficient to disengage the nut 130 end from the piston 102. In other words, the nut 130, reducer 150, and spindle 192 can move axially relative to the piston 102.

Furthermore, with the end 133 disengaged from the piston 102, the spindle 192 can tilt about its axis 194, thereby causing the nut 130 and volume reducer 150 connected thereto to move out of alignment with the axis. Additionally or alternatively, the nut 130 can tilt from the spindle axis 194 relative to the spindle 190 due to relatively loose threaded interface therebetween. In either case, the tapered end 133 of the nut 130 engages/rattles against the tapered surface defining the second cavity 114 of the piston 102 It's noted that both the nut 130 and piston 102 are metal, thus metal-to-metal contact may cause rattle noise. These axial and pivoting movements can occur due to, for example, tolerances in the components 130, 150, 190, heat, wear, vibration or the like—especially as the vehicle is moving.

With this in mind, the damping member 182 advantageously helps to keep the components 130, 150, 192 centered within the piston 102, i.e., maintain alignment between the centerline 104 and axis 194, while helping to prevent undesirable rattling of the nut 130 against the piston 102 and/or of the reducer against the inner surface 109 of the piston. Moreover, the damping member 182 is configured to interact with the inner surface 109 in a manner that doesn't significantly impede axial movement of the components 130, 150, 192 relative to the piston 102 or vice versa.

To this end, the material selection and/or surface area contact between the damping member 182 (via the projections 188 in the example shown) and the inner surface 109 can be chosen to minimally affect relative movement between the components 130, 150, 192 and the piston. The ratio L/d can also be adjusted/selected such that relative movement between the volume reducer 150 and the piston 102 is minimally affected. With a given radial spacing between the piston 102 and the volume reducer 150, the ratio L/d affects the degree of axial and radial loading experienced by the damping member 182 during relative movement between the components 102, 150. More specifically, maximizing the radial loading but minimizing the degree of axial loading on the damping member 182 evidences a reduced impact on relative movement between the volume reducer 150 and the piston 102.

Figure 10:
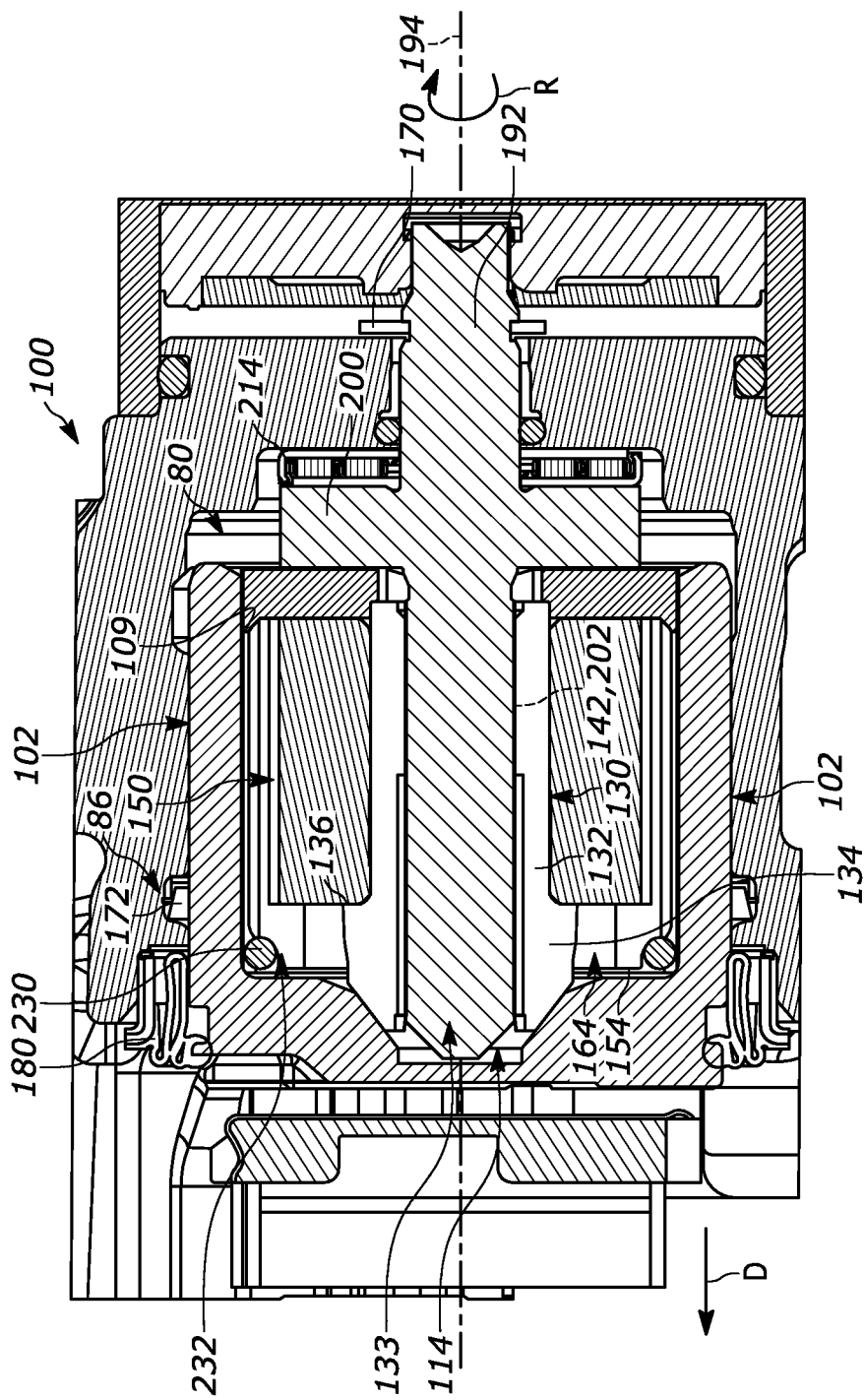
FIG. 10 is a section view of another example piston assembly.
Figure 11:
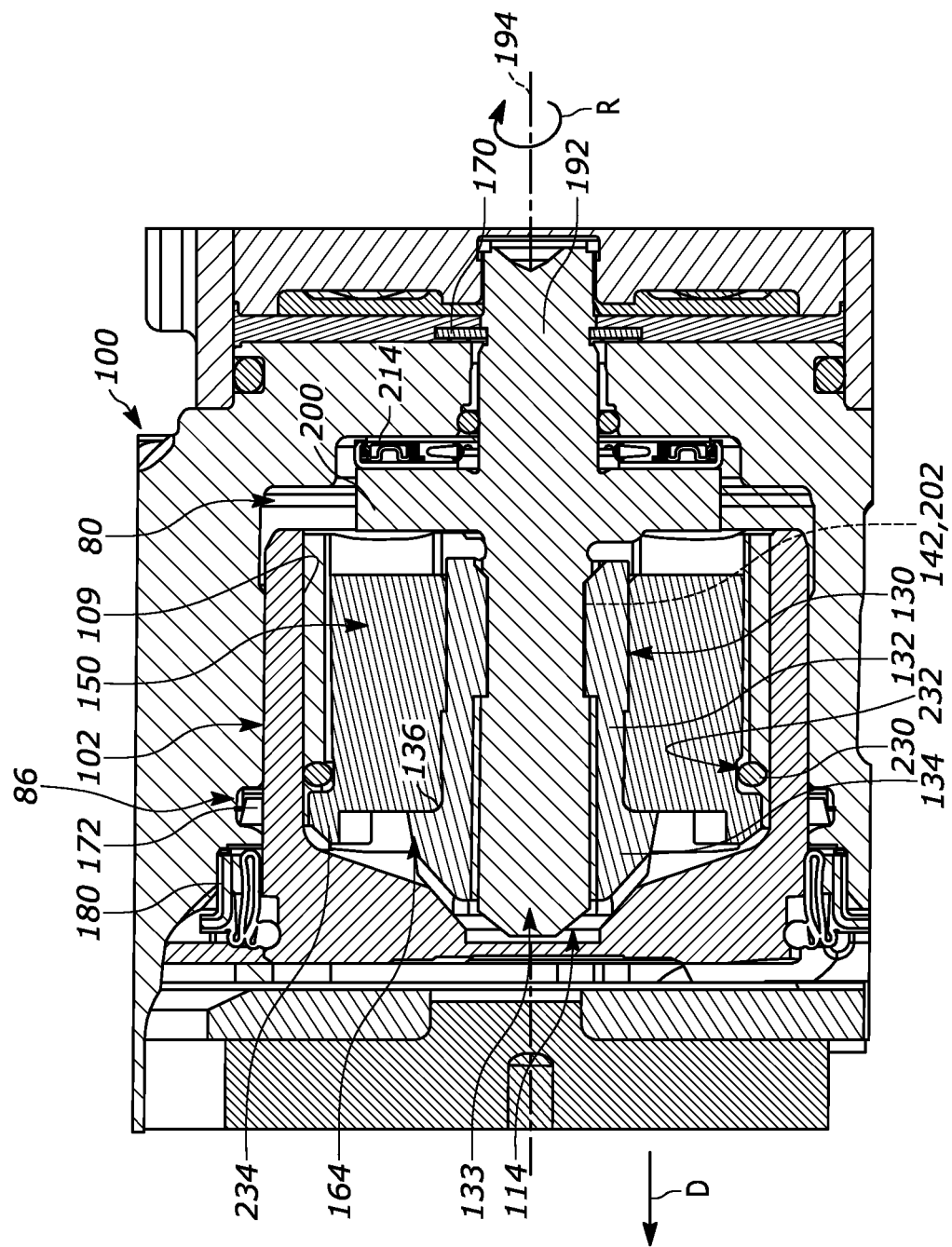
FIG. 11 is a section view of another example piston assembly.

FIGS. 10 and 11 illustrate alternative configurations for the damping member. In FIG. 10, the damping member 230 is formed as an O-ring and therefore has a circular circumferential cross-section. The axial extent of the volume reducer 150 includes a recess 232 provided at the axial end surface 154 and encircling the axis 194. The recess 232 is configured to receive the damping member 230 in a manner that does not fix the position of the damping member on the volume reducer 150 at a single location. Rather, the damping member 230 is permitted to shift its axial position on the volume reducer 150 in response to relative movement between the piston 102 and the volume reducer.

In other words, due to the round cross-section of the damping member 230, in combination with some friction/interference fit between the damping member, the recess 232, and inner surface 109 of the piston 102, the damping member rolls [instead of slides] within the recess 232 and along the inner surface 109 during axial movement of the components 130, 150, 192 relative to the piston 102. Rolling of the damping member 230 occurs because the force required to roll the damping member is less than the force required to slide the damping member. Consequently, the rolling damping member 230 experiences minimal axial or radial loads compared to a damping member that slides along the inner surface 109 and, thus, the rolling damping member advantageously has minimal impact on relative movement between the volume reducer 150 and piston 102.

In FIG. 11, the damping member 230 is also formed as an O-ring but positioned in a different location on the volume reducer 150. More specifically, the recess 232 for the damping member 230 is spaced from the axial end surface 154 of the volume reducer 150. Instead, a flange 234 extends radially outward from the volume reducer 150 adjacent the recess 232 to help retain the damping member 230 therein. That said, the recess 232 and flange 234 are configured to allow the damping member 230 to roll within the recess and along the inner surface 109 during axial movement of the components 130, 150, 192 relative to the piston 102, i.e., the damping member has a rolling interface with the inner surface. The rolling damping member 230 in FIG. 11 therefore provides the same advantages compared to a damping member that slides along the inner surface 109.

Figure 12:
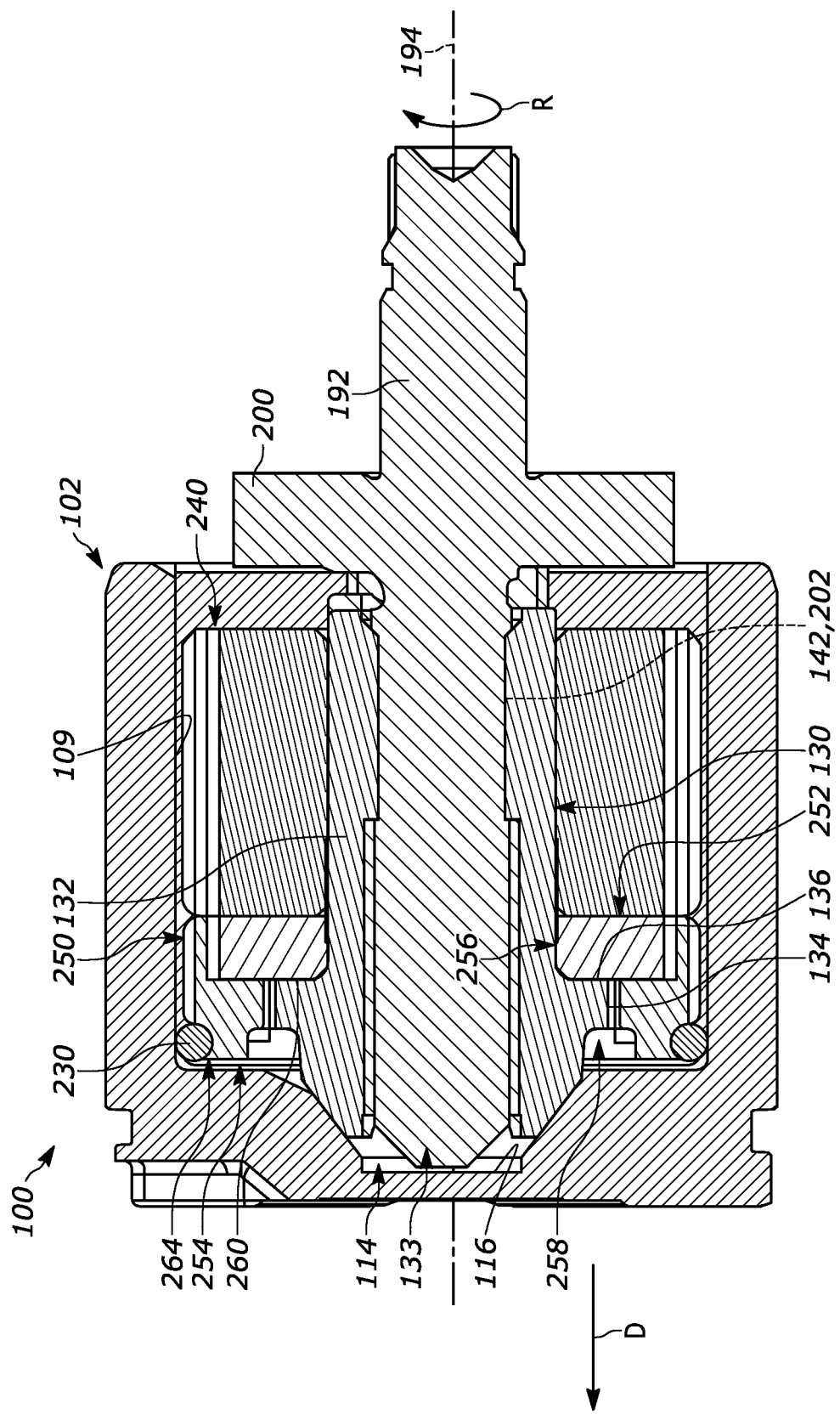
FIG. 12 is a section view of another example piston assembly.

FIG. 12 illustrates another example configuration for the piston assembly 100. In this example, the volume reducer is formed from two components, namely, a first portion 240 and a second portion 250. Each of the first and second portions 240, 250 is ring-shaped and keyed to the nut 130, e.g., via splined connection, to prevent relative rotation therebetween. The first portion 240 is made from a lightweight material.

The second portion 250 includes a first side 252 and a second side 254. The first side 252 abuts the first portion 240. A recess 258 extends from the second side 254 towards the first side 252 and receives the flange 134 of the nut 130. A recess 264 is formed at the second side 254 at the axial extent thereof for receiving the damping member 230. The second portion 250 is formed from a lightweight material that may or may not be different from the material of the first portion 240. In one example, both portions 240, 250 can be formed from aluminum.

Alternatively, the first portion 240 can be phenolic and the second portion 250 aluminum. In any case, the material(s) for the first and second portions 240, 250 should be selected to minimize the moments of inertia of the portions such that the load to be damped by the damping member 230 during vibration of the piston assembly is minimized. The first portion 240 can also be omitted (not shown) to reduce the moment of inertia acting on the damping member 230.

The second portion 250 can be keyed to the inner surface 109 of the piston 102 to prevent relative rotational movement therebetween. The first portion 240 can also be keyed to the inner surface 109 or, in the alternative, be cylindrical. In the latter configuration, the first portion 240 does not contact the inner surface 109.

That said, the damping member 230 cooperates with the recess 264 in the second portion 250 in a manner that allows the damping member to roll within the recess and along the inner surface 109 during axial movement of the components 130, 192, 240, 250 relative to the piston 102. The damping member 230 therefore has a rolling interface with the inner surface 109.

Similar to the embodiments directed to the damping member 182 having the projections 188, in the embodiments of FIGS. 10-12 it will be appreciated that the rolling O-ring damping member 230 can be connected to the nut 130 instead of the volume reducer. In other words, the volume reducer 150, 240, 250 can be omitted in FIGS. 10-12 and the damping member 230 provided directly in a recess in the nut 130. In such constructions, the flange 134 of the nut 130 can be enlarged to accommodate the damping member 230 while ensuring the damping member also contacts the inner surface 109. In one example, the enlarged flange 134 can have the same shape as the flange 234 and recess 232 shown in FIG. 11 or the same shape as the second portion 250 (or both the first and second portions 240, 250) shown in FIG. 12.

From the above, it is clear that the damping member of the present invention—whether sliding or rolling on the inner surface of the piston—advantageously helps to maintain the spindle, nut, and volume reducer aligned with the center of the piston to help prevent rattling of the nut and/or the volume reducer against the inside of the piston. At the same time, the material and/or shape of the damping member is configured to minimally affect axial movement of the volume reducer—as well as the nut and spindle connected thereto—relative to the piston during braking operations. Facilitating axial movement can be accomplished by the rolling interface or the reduced surface area contact/interface between the damping member projections and piston inner surface.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A piston assembly for a disc brake assembly having a housing with a passage, comprising:
   a piston provided in the passage and axially movable therein in response to hydraulic pressure;
   a rotatable spindle extending into the piston;
   a nut threadably connected to the spindle such that rotation of the spindle results in axial movement of the nut within the passage to thereby axially move the piston; and
   a damping member encircling the nut and having a rolling interface with the piston in response to relative axial movement between the nut and the piston to prevent rattling of the nut against the piston.

2. The piston assembly of claim 1, further comprising a volume reducer connected to the nut and having a recess for receiving the damping member.

3. The piston assembly of claim 2, wherein the recess for the damping member is provided in an axial extent of the volume reducer.

4. The piston assembly of claim 2, wherein the damping member rolls between the volume reducer and the piston in response to relative axial movement between the nut and the piston.

5. The piston assembly of claim 2, wherein the volume reducer includes a flange for retaining the damping member within the recess.

6. The piston assembly of claim 2, wherein the nut includes a flange for engaging the damping member to retain the damping member within the recess in the volume reducer.

7. The piston assembly of claim 2, wherein the volume reducer comprises a first portion made of a first material and a separate second portion made of a second material.

8. The piston assembly of claim 7, wherein the first and second materials are different from one another.

9. The piston assembly of claim 1, wherein the damping member is annular and has a circular cross-section in the circumferential direction.

10. The piston assembly of claim 1, wherein the nut includes a recess for receiving the damping member.

11. The piston assembly of claim 10, wherein the recess for the damping member is provided in an axial extent of the nut.

12. The piston assembly of claim 11, wherein the damping member rolls between the nut and the piston in response to relative axial movement therebetween.

13. The piston assembly of claim 11, wherein the nut includes a flange for retaining the damping member within the recess.

14. A piston assembly for a disc brake assembly having a housing with a passage, comprising:
   a piston provided in the passage and axially movable therein in response to hydraulic pressure;
   a rotatable spindle extending into the piston;
   a nut threadably connected to the spindle such that rotation of the spindle results in axial movement of the nut within the passage to thereby axially move the piston;
   a volume reducer connected to the nut and having a recess; and
   an annular damping member provided in the recess and having a circular cross-section in the circumferential direction, the damping member having a rolling interface between the recess and the piston in response to relative axial movement between the nut and the piston to prevent rattling of the nut against the piston.

15. The piston assembly of claim 14, wherein the recess for the damping member is provided in an axial extent of the volume reducer.

16. The piston assembly of claim 14, wherein the volume reducer includes a flange for retaining the damping member within the recess.

17. The piston assembly of claim 14, wherein the nut includes a flange for engaging the damping member to retain the damping member within the recess in the volume reducer.

18. The piston assembly of claim 14, wherein the volume reducer comprises a first portion made of a first material and a second portion made of a second material.

19. The piston assembly of claim 18, wherein the first and second materials are different from one another.

20. The piston assembly of claim 14, wherein the damping member is annular and has a circular cross-section in the circumferential direction.

\* \* \* \* \*